Oct. 5, 1937.  G. R. GRANDBOUCHE  2,095,187

MACHINE, A FORM ROD CONCRETE CALKER

Filed June 16, 1936

Inventor:

George Rollin Grandbouche

Patented Oct. 5, 1937

2,095,187

UNITED STATES PATENT OFFICE 2,095,187

MACHINE, A FORM-ROD CONCRETE CALKER

George Rollie Grandbouche, Avoca, Iowa

Application June 16, 1936, Serial No. 85,549

2 Claims. (Cl. 72—128)

The invention relates to the calking of holes left in concrete walls by form rods; and the object is to furnish a means of introducing and packing a mortar in such holes in one operation by means of a cylinder and piston arrangement.

The invention will be described in detail hereinafter and will be found to illustrate the accompanying drawing in which.

Figure 1:
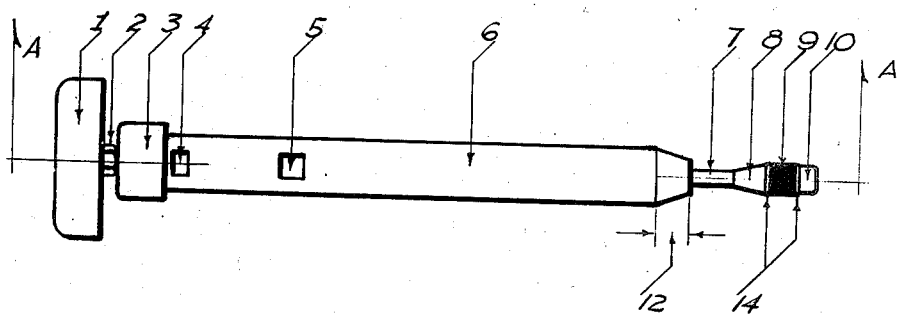
Figure 1 is a view in elevation of the form-rod concrete calker.
Figure 2:
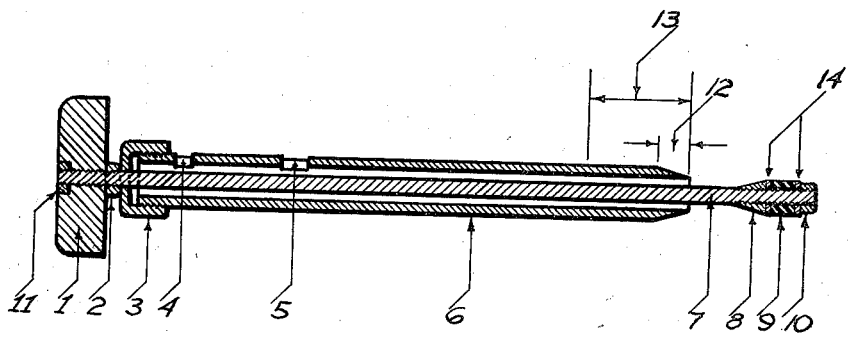
Figure 2 is a longitudinal sectional view on the plane indicated by the line A—A of Figure 1.
Figure 3:
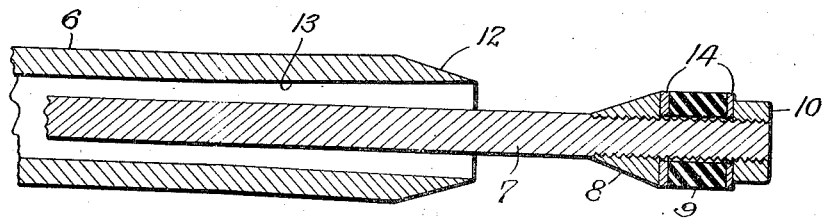
Figure 3 is a sectional view on an enlarged scale, and on the same plane, of one end of the tool.

My invention consists of a metal tube acting as a cylinder, the diameter of which shall vary as the diameter of form rods varies, the length of which shall vary proportionally in order to accommodate the larger or smaller volume of material required to fill holes of greater or lesser dimensions. The tube 6 is equipped with a clean-out and inspection hole 4 for such mortar as collects behind the piston 9, 10; and an air vent 5 to prevent an air pressure from building up in the tube as the mortar is introduced. The outlet end of the inside wall of the tube is reamed to taper to a larger diameter at the outlet for the two-fold purpose of smoothness, and to prevent the mortar from packing before it leaves the tube as pressure is exerted on the piston. The taper is indicated by 13. The outside wall of the tube is beveled at the outlet end in order that the tube will fit firmly into the form-rod hole, the diameter of the outside of the tube being slightly larger than the diameter of the form-rod hole and the diameter of the inside of the tube being smaller than the form-rod hole. This bevel is shown by 12.

Operating inside of the tube is a piston and piston rod, or plunger, consisting of a metal rod of greater length than the tube 7, and a rubber gasket 9 held at the end of the rod by a round nut 10 and a cone nut 8. By tightening these nuts the gasket is made to fit as tightly against the tube wall as desired. The rod is threaded at both ends sufficiently to allow for the fittings. This plunger (piston and rod) is equipped with a handle 1 in the form of a circular disc which offers a flat area which can be struck with the hand. This piston rod operates through a threaded cap 3 at one end of the tube which acts both as a stop for the piston and a guide for the rod.

The plunger handle 1 is held in place on the rod by two hexagonal nuts 11 and 2. Hexagonal nut 11 is countersunk in the handle. Two standard washers 14 separate the rubber gasket 9 from the two nuts 8 and 10.

I am aware that prior to my invention cylinder and piston arrangements have been used for the purpose of expelling the content of the cylinder by means of the piston. I therefore do not claim such a combination broadly; but

I claim:

1. A calker structure of the class described comprising a cylinder open at one end, a plunger rod extending through the cylinder and beyond said end, said plunger rod being of less diameter than the bore of the cylinder, a knob on said rod for manually operating it, said plunger rod having a head thereon at the end adjacent said end of the cylinder of substantially the same diameter as said bore, said bore adjacent said end being flared outwardly toward said end, said head comprising an expansive ring, and elements adjustably connected to the rod disposed on opposite sides of the ring and operable to control its diameter.

2. A calker structure of the class described comprising a cylinder open at one end, a plunger rod extending through the cylinder and beyond said end, said plunger rod being of less diameter than the bore of the cylinder, a knob on said rod for manually operating it, said plunger rod having a head thereon at the end adjacent said end of the cylinder of substantially the same diameter as said bore, said bore adjacent said end being flared outwardly toward said end, said head comprising an expansive ring, elements adjustably connected to the rod disposed on opposite sides of the ring and operable to control its diameter, said cylinder having an inspection opening therethrough and a vent opening between the first mentioned opening and said end of the cylinder.

GEORGE R. GRANDBOUCHE.